United States Patent [19]

Yamada et al.

[11] Patent Number: 4,582,409
[45] Date of Patent: Apr. 15, 1986

[54] ALBADA FINDER WITH DISPLAY WITHIN THE FIELD OF VIEW

[75] Inventors: Yasuyuki Yamada, Tokyo; Yasuhisa Sato; Hiroki Nakayama, both of Kanagawa; Hideo Yokota, Kanagawa, all of Japan

[73] Assignee: Canon Kabushiki Kaisha, Tokyo, Japan

[21] Appl. No.: 653,967

[22] Filed: Sep. 24, 1984

[51] Int. Cl.[4] .................. G03B 13/08; G03B 17/20
[52] U.S. Cl. .................................. 354/224; 354/289.1
[58] Field of Search ............ 354/219, 221, 222, 223, 354/224, 225, 289.1

[56] References Cited

U.S. PATENT DOCUMENTS

| 3,575,082 | 4/1971 | McClure | 354/225 |
|---|---|---|---|
| 4,217,050 | 8/1980 | Sato et al. | 354/225 |
| 4,429,978 | 2/1984 | Ikari | 354/224 |
| 4,441,802 | 4/1984 | Iizuka | 354/224 |
| 4,530,583 | 7/1985 | Yamada | 354/224 |

Primary Examiner—A. A. Mathews
Attorney, Agent, or Firm—Toren, McGeady, Stanger, Goldberg & Kiel

[57] ABSTRACT

An Albada finder is constructed of an objective lens, a reflection layer, a field-of-view defining frame, and an eyepiece arranged in sequence to provide a mirror image of the frame from the reflection layer to the eyepiece. An optical device of positive power is arranged outside an optical path of the finder. An information source with an information display plate and an illuminator for illuminating the display plate are arranged so that light from the display plate comes through the optical device into the eyepiece as an oblique beam. This shortens the distance from the reflection layer to the eyepiece while achieving a sharp information display.

5 Claims, 7 Drawing Figures

FIG. I
PRIOR ART
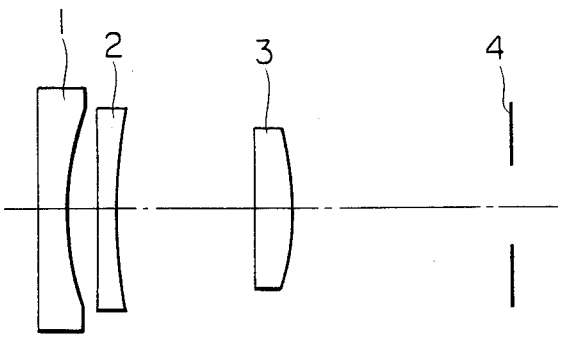
FIG. 2
PRIOR ART
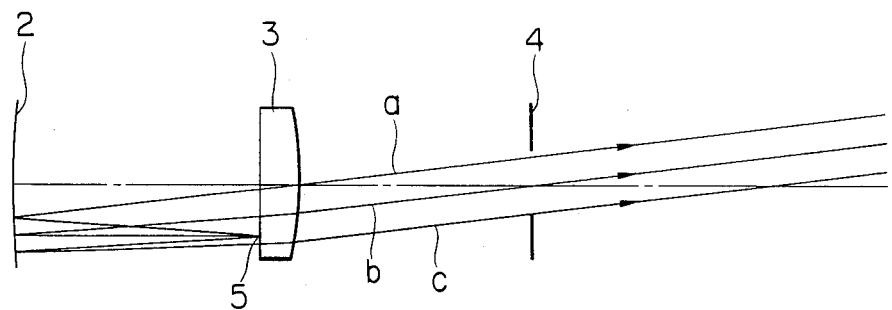
FIG. 3
PRIOR ART
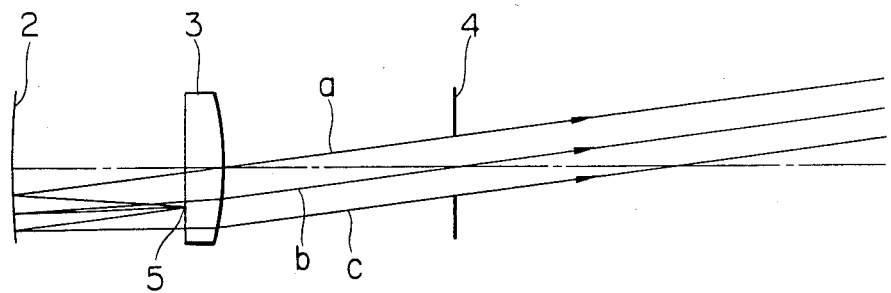

ALBADA FINDER WITH DISPLAY WITHIN THE FIELD OF VIEW

BACKGROUND OF THE INVENTION

1. Field of the Invention

This invention relates to a display device within the finder of a camera, and more particularly to a display device suited for Albada finders.

2. Description of the Prior Art

The continuing trend to minimizing the bulk and size of cameras introduces an increasing demand to reduce the size of the camera finders. This is especially true in leaf shutter type cameras, or mid-price cameras, where an automatic focus detector is provided in the interior of the camera and the space needed for the detector further decreases the proportion of the space available for the finder in the camera. For this reason, examples of a mark finder that occupies a large space in mid-price auto-focus cameras has become very rare in recent years, and most of the cameras of this class employ an Albada type of finder.

FIG. 1 is a longitudinal section view of the optical system of a conventional Albada finder with an objective lens 1 of negative refractive power, a half-permeable concave lens 2 constituting a half-permeable reflection layer provided with a concave surface on the observation side, and an eyepiece 3. Reference numeral 4 indicates the position of an observer's pupil.

To reduce the size of this Albada finder, narrowing the separation between the half-permeable concave lens 2 and the eyepiece 3 seems logical. However, the reduction of the distance between the half-permeable concave lens 2 and the eyepiece 3 results in the following problem.

FIG. 2 illustrates an optical system where the half-permeable concave lens and the eyepiece are widely spaced from each other, and FIG. 3 another optical system where they are narrowly spaced. In FIGS. 2 and 3, the same parts as those shown in FIG. 1 are labelled with the identical reference numerals and their description is omitted here. Reference numeral 5 denotes a part of a reflective viewfield limit frame for displaying a photographic area, and "a", "b" and "c" represent, respectively, an upper marginal ray, a principal ray, and a lower marginal ray of a beam incident on the eye's pupil.

In comparing FIGS. 2 and 3, when the space between the half-permeable concave lens and the eyepiece is wide, as shown in FIG. 2, the reflective viewfield limiting frame 5 lies between the principal ray "b" and the lower marginal ray "c" at a point near the lower marginal ray "c". On the other hand, when that space is narrow, as shown in FIG. 3, frame 5 lies between the principal ray "b" and the lower marginal ray "c" at a point near the principal ray "b".

One of the inventors of the present invention has developed a display device for use within the finder. This is disclosed in U.S. patent application Ser. No. 279,221, filed June 30, 1981, now abandoned, which is succeeded by file wrapper continuation U.S. patent application Ser. No. 471,720, now U.S. Pat. No. 4,530,583. Its outline is shown in FIG. 4, where the objective lens is excluded from the illustration. The device includes a prism for illumination, a light source 7 and a display plate 8 to be displayed within the finder. The remaining reference numerals denote parts similar to those labelled the same reference numerals in FIGS. 2 and 3.

The inside-finder display device of FIG. 4 operates such that light from the light source 7 passes through the prism 6 to illuminate the display plate 8. Light from the illuminated display plate 8, after having been reflected from that surface of the half-permeable concave lens 2 on the observation side, passes through the eyepiece 3 to reach the pupil 4. Let us now consider the difference produced when this display device is applied to the two finders of FIGS. 2 and 3.

In observing through the finder, it is preferable that the display within the finder, for example, the object distance display, appear near the viewfield limiting frame 5, from the standpoint of convenience in relation to the object image to be observed. For this purpose, the display plate 8 must not be too far from the reflective viewfield limiting frame 5. In FIG. 4, it is not desirable that the display plate 8 be significantly spaced downward and away from the reflective viewfield limiting frame 5.

In the finder of FIG. 2, even when the display plate 8 and the prism 6 for illumination are arranged adjacent the reflective viewfield limiting frame 5, (the prism 6 for illumination is located slightly below the reflective viewfield limiting frame 5 as shown in FIG. 4), the rays "a", "b", and "c" are not all blocked by the prism 6 and are capable of reaching the pupil 4. In the finder of FIG. 3 where the half-permeable concave lens 2 and the eyepiece 3 are narrowly spaced, the reflective viewfield limiting frame 5 lies near the principal ray "b" and the lower marginal ray "c" is blocked by the prism 6 arranged adjacent the reflective viewfield limiting frame 5, as shown in FIG. 5. Additionally, the light beam from the display plate 8 illuminated by the light source 7 is partially blocked by the illuminating prism 6. For this reason, the arrangement of FIG. 5 makes the inside-finder very unclear.

SUMMARY OF THE INVENTION

A first object of the present invention is to shorten the finder in the longitudinal direction, while nevertheless achieving a sharp finder information to be display.

A second object is to provide the possibility of presenting a display near the photographic area indicating frame.

A third object is to remove the drawback that the display device blocks part of a light beam forming a mirror image of the photographic area indicating frame, and to assure that the photographic area indicating frame can be clearly viewed.

A fourth object is to provide an Albada finder which includes, from front to rear, an objective lens, a half-permeable reflection layer, a viewfield limiting frame for displaying a photographic area, and an eyepiece. The viewfield limiting frame is illuminated by light entering through the objective lens. The reflected light from the viewfield limiting frame is reflected by the half-permeable reflection layer to the eyepiece, a display plate positioned near the objective lens is illuminated by ambient light and a positive optic positioned outside an optical path of the finder directs light from the display plate to the eyepiece. It is thus possible to observe the viewfield limiting frame and characters of the display plate simultaneously.

BRIEF DESCRIPTION OF THE DRAWINGS

FIG. 1 is a schematic sectional view of the conventional Albada finder.

FIG. 2 is a diagram of an optical path of the FIG. 1 finder when the space between the half-permeable concave lens and the eyepiece is wide.

FIG. 3 is similar to FIG. 2 except the space is narrow.

DETAILED DESCRIPTION OF THE PREFERRED EMBODIMENT

The present invention is described in connection with an embodiment thereof with reference to the drawings.

Figure 4:
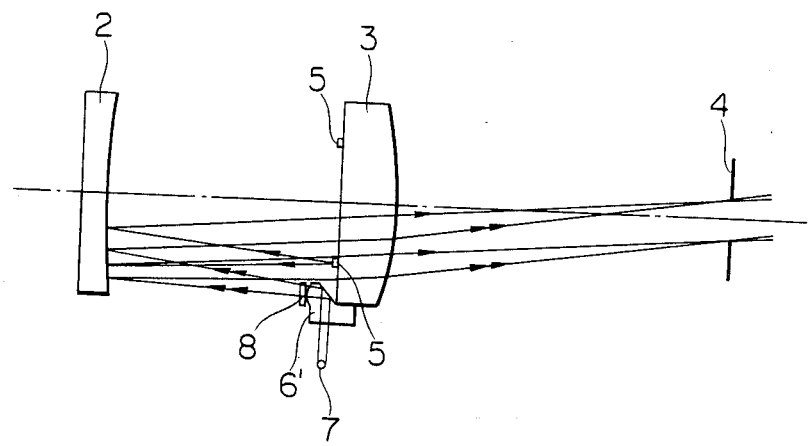
FIG. 4 is a sectional view of the prior known information display device incorporated in the finder of FIG. 2.
Figure 5:
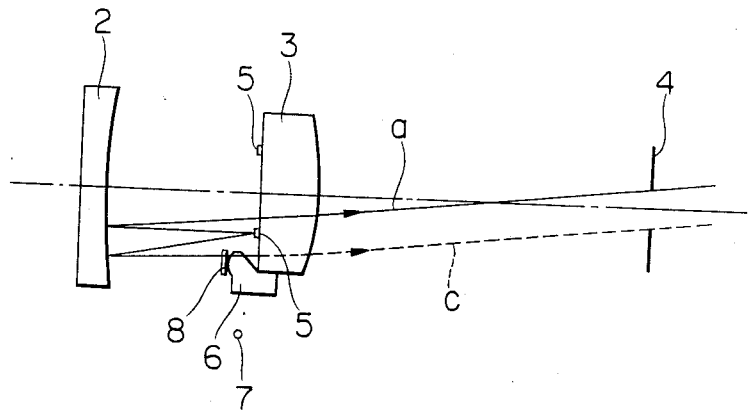
FIG. 5 is similar to FIG. 4 except incorporated in the finder of FIG. 3.
Figure 6:
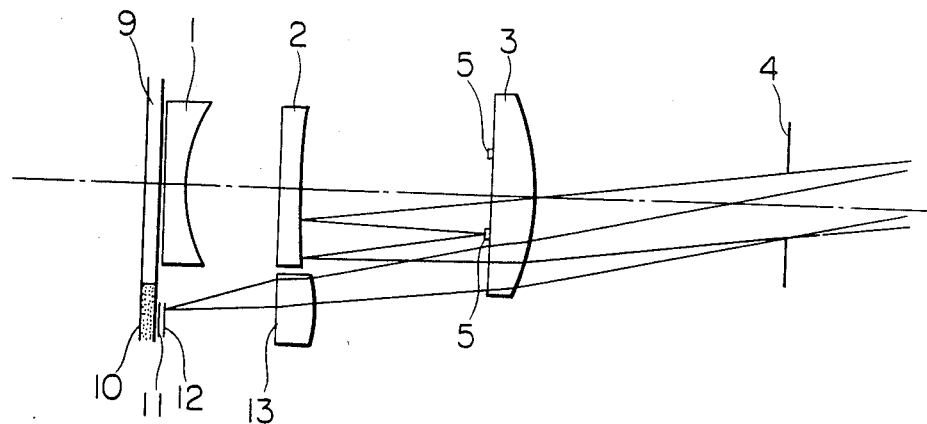
FIG. 6 is a schematic sectional view of an embodiment of an Albada finder according to the present invention.

FIG. 6 illustrates an Albada finder having the finder information device of the invention. In FIG. 6, the same reference characters have been employed to denote the similar parts to those shown in FIGS. 1 to 5. A protection glass 9 is positioned adjacent the front surface of the objective lens 1 and is fixedly secured to the camera housing. A light diffusing portion 10 is formed on the protection glass 9. A display 11 and a movable needle 12 are positioned adjacent the bottom of the objective lens 1. A positive lens 13 is positioned adjacent the bottom of the half-permeable concave lens 2. The center of the display plate 11 lies below (outside) the optical axis of the positive lens 13.

The display plate 11 and the positive lens 13 provide an oblique pencil and constitute the inside-finder display device of the invention.

Figure 7:
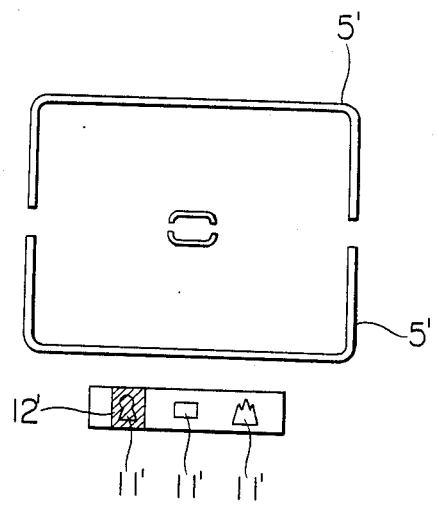
FIG. 7 is a plan view of the displays observed through the FIG. 6 finder.

In operation an external light entering through the projection glass 9 and the objective lens 1 illuminates the reflective viewfield limiting frame 5. The reflected light from the frame 5 reflects from the rear surface of the half-permeable concave lens 2 and then reaches the eyepiece 3, forming a mirror image 5' of the frame 5 as shown in FIG. 7.

Meanwhile, the external light entering through the light diffusing portion 10 on the projection glass 9 illuminates the display plate 11 and the needle 12. Light from the display plate 11 and the needle 12 passes through the positive lens 13 obliquely while refracting to the eyepiece 3 and emerges therefrom in almost collimated beam, displaying images 11' and 12' of the display plate 11 and the needle 12, respectively, as shown in FIG. 7. Accordingly, the mirror image 5' of the reflective viewfield limiting frame 5 and the mirror image 11' and 12' of the characters on the display plate 11 and the needle 12 are simultaneously observed.

In the above described display device, in order that the eyesight of the observer matches the display plate 11, use is made of the positive lens 13. However, either reflection by a concave mirror may be used, or the reflection of a plain mirror may be combined with a lens.

What is claimed is:

1. A device comprising:
   (a) a viewfinder having an objective lens and an eyepiece;
   (b) a viewfield limiting frame between the objective lens and the eyepiece;
   (c) a reflection layer for providing a reflected image of the viewfield limiting frame to the eyepiece;
   (d) an optic of positive power arranged outside an optical path of the viewfinder; and
   (e) information means having display means for displaying information and illuminating means for illuminating the display means, said information means being arranged so that a light beam issuing from the display means passes through the optic to the eyepiece.

2. A device according to claim 1, wherein said display means includes a plate having characters thereon and a pointer.

3. A device according to claim 1, wherein said illuminating means is a light diffusing window through which scene light enters.

4. A device according to claim 1, wherein said reflection layer is provided on a concave surface of a plano-concave lens arranged between the objective lens and the eyepiece.

5. A device according to claim 1, wherein said optic is a biconvex lens.

* * * * *

UNITED STATES PATENT AND TRADEMARK OFFICE
CERTIFICATE OF CORRECTION

PATENT NO. : 4,582,409
DATED : April 15, 1986
INVENTOR(S) : Yasuyuko Yamada, et al It is certified that error appears in the above-identified patent and that said Letters Patent is hereby corrected as shown below:

In the heading of the patent, it should read:

-- [30] Foreign Application Priority Data
Sept. 28, 1983 [JP]   Japan   58-149730 --

Signed and Sealed this
Twenty-eighth Day of October, 1986

[SEAL]

*Attest:*

DONALD J. QUIGG

*Attesting Officer*   *Commissioner of Patents and Trademarks*